US010223146B2

(12) United States Patent
Agarwal et al.

(10) Patent No.: US 10,223,146 B2
(45) Date of Patent: Mar. 5, 2019

(54) REARRANGEMENT MANAGEMENT FOR A SHARED POOL OF CONFIGURABLE COMPUTING RESOURCES

(71) Applicant: International Business Machines Corporation, Armonk, NY (US)

(72) Inventors: Amit Agarwal, Bangalore (IN); Uma Maheswara R. Chandolu, Hyderabad (IN); Chetan L. Gaonkar, Kumta (IN); Shailaja Mallya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 15/219,873

(22) Filed: Jul. 26, 2016

(65) Prior Publication Data
US 2018/0032360 A1    Feb. 1, 2018

(51) Int. Cl.
*G06F 9/455*    (2018.01)

(52) U.S. Cl.
CPC ........ *G06F 9/45558* (2013.01); *G06F 2009/45583* (2013.01); *G06F 2212/1052* (2013.01)

(58) Field of Classification Search
None
See application file for complete search history.

(56) References Cited

U.S. PATENT DOCUMENTS

| 6,934,755 | B1 | 8/2005 | Saulpaugh et al. | |
|---|---|---|---|---|
| 8,464,104 | B2 | 6/2013 | Ganesh et al. | |
| 2009/0288084 | A1* | 11/2009 | Astete | G06F 9/45533 718/1 |
| 2011/0145916 | A1* | 6/2011 | McKenzie | G06F 21/83 726/19 |
| 2016/0259750 | A1* | 9/2016 | Keidar | G06F 9/45558 |

OTHER PUBLICATIONS

Mell, Peter, et al., The NIST Definition of Cloud Computing, National Institute of Standards and Technology, Oct. 7, 2009, Version 15, NIST, Gaithersburg, MD, US.

* cited by examiner

*Primary Examiner* — Wynuel S Aquino
(74) *Attorney, Agent, or Firm* — Stephanie L. Carusillo

(57) ABSTRACT

Disclosed aspects relate to rearrangement management for a shared pool of configurable computing resources including a source asset, a target asset, and a memory device having a set of data. A first subset of the set of data on the memory device may be locked with respect to modification. A first set of logical address identifiers for the first subset of the set of data on the memory device may be identified in a hypervisor mapping table in a first set of source entries for the source asset. The first set of logical address identifiers for the first subset of the set of data on the memory device may be established in the hypervisor mapping table in a first set of target entries for the target asset. The first subset of the set of data on the memory device may be unlocked with respect to modification.

19 Claims, 7 Drawing Sheets

REARRANGEMENT MANAGEMENT FOR A SHARED POOL OF CONFIGURABLE COMPUTING RESOURCES

BACKGROUND

This disclosure relates generally to computer systems and, more particularly, relates to rearrangement management for a shared pool of configurable computing resources. The amount of data that needs to be managed by enterprises is increasing. Data access may be desired to be performed as efficiently as possible. As data needing to be managed increases, the need for efficient data access may increase.

SUMMARY

Aspects of the of the disclosure relate to rearrangement management for a shared pool of configurable computing resources including a source asset, a target asset, and a memory device having a set of data. The logical mapping corresponding to a subset of the set of data may be changed from a source asset to a target asset. Access to the affected data subset may be limited to facilitate uninterrupted data transfer. Data transfer for data subsets that include recently completed processes and un-dispatched threads may be prioritized, and transfer of remaining data subsets may be transferred based on characteristics of previously transferred data or system resource availability. Leveraging logical address mapping techniques for data transfer may be associated with reduced application downtime and increased data transfer efficiency.

Disclosed aspects relate to rearrangement management for a shared pool of configurable computing resources including a source asset, a target asset, and a memory device having a set of data. A first subset of the set of data on the memory device may be locked with respect to modification. A first set of logical address identifiers for the first subset of the set of data on the memory device may be identified in a hypervisor mapping table in a first set of source entries for the source asset. The first set of logical address identifiers for the first subset of the set of data on the memory device may be established in the hypervisor mapping table in a first set of target entries for the target asset. The first subset of the set of data on the memory device may be unlocked with respect to modification.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
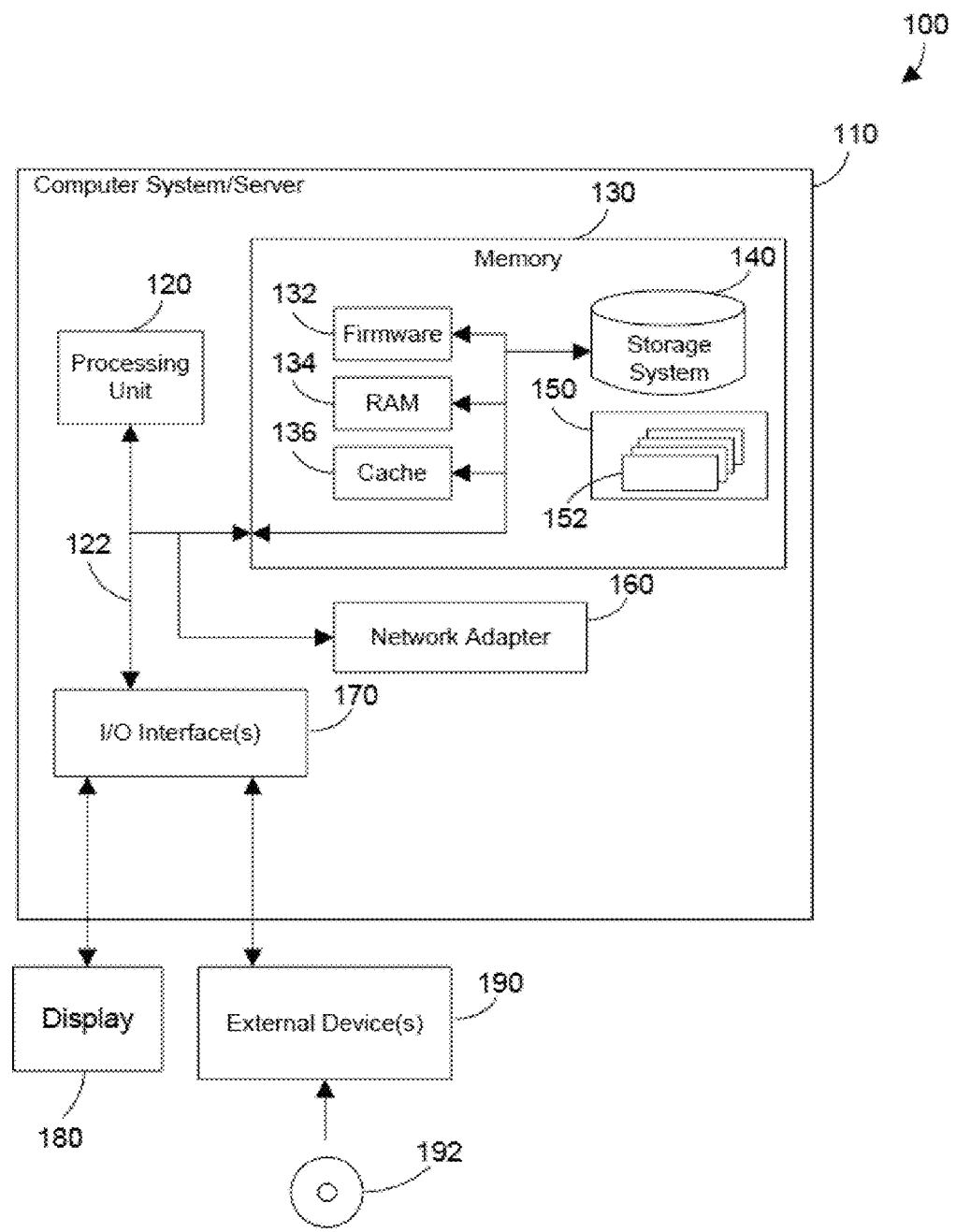
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the of the disclosure relate to rearrangement management for a shared pool of configurable computing resources including a source asset, a target asset, and a memory device having a set of data. The logical mapping (e.g., logical address identifiers) corresponding to a subset of the set of data may be changed from a source asset (e.g., logical partition, virtual machine) to a target asset. Access to the affected data subset may be limited (e.g., locked, frozen, check-pointed) to facilitate uninterrupted data transfer. Data transfer for data subsets that include recently completed processes and un-dispatched threads (e.g., data that will not be used again soon) may be prioritized, and transfer of remaining data subsets may be transferred based on characteristics of previously transferred data (e.g., total data transfer amount) or system resource availability. Leveraging logical address mapping techniques for data transfer may be associated with reduced application downtime and increased data transfer efficiency.

Maintaining efficient methods of data migration between different network locations is one important aspect of managing network environments. Migrating data, applications, and memory pages from one virtual machine or logical partition of a network to another can often be both time and bandwidth intensive, and mistaken predictions regarding the resources needed for migration can lead to wasteful overhead and contention between logical partitions within the network. Aspects of the disclosure, in embodiments, relate to changing logical mappings of a subset of a set of data stored on a memory device (e.g., shared, network memory) from a source asset (e.g., first logical partition) to a source asset (e.g., second logical partition) to allow for the target asset to access the subset of the set of data (e.g., without full migration of the set of data from the source asset to the target asset). Aspects of the disclosure may be associated with benefits including reduced transfer bandwidth and reduced application downtime.

Aspects of the disclosure include a method, system, and computer program product for rearrangement management for a shared pool of configurable computing resources including a source asset, a target asset, and a memory device having a set of data. The source and target assets may include a set of virtual machines and a set of logical partitions. Aspects of the disclosure relate to locking a first subset of the set of data on the memory device. Locking the set of data may include preventing a set of write-accesses to the set of data, preventing a set of read-accesses to the set of data, or permitting a set of read-accesses to the set of data. A first set of logical address identifiers for the first subset of the set of data on the memory device may be identified in a hypervisor mapping table in a first set of source entries for the source asset. The first set of logical address identifiers for the first subset of the set of data on the memory device may be established in the hypervisor mapping table in a first set of target entries for the target asset. The first subset of the set of data on the memory device may be unlocked. In embodiments, the first set of logical address identifiers for the first subset of the set of data on the memory device may be removed from the hypervisor mapping table in the first set of source entries for the source asset.

In embodiments, a first non-utilization status may be detected for the first subset of the set of data on the memory device. The first non-utilization status may have a first temporal period of non-utilization. In embodiments, a second non-utilization status having a second temporal period of non-utilization may be detected for a second subset of the set of data on the memory device. The first and second temporal periods of non-utilization may be compared, and it may be calculated that the second temporal period of non-utilization exceeds the first temporal period of non-utilization. In response to establishing the first set of logical address identifiers for the first subset of the set of data on the memory device in the hypervisor mapping table in the first set of target entries for the target asset, the second subset of the set of data on the memory device may be locked. A second set of logical address identifiers for the second subset of the set of data on the memory device may be identified in the hypervisor mapping table in a second set of source entries for the source asset, and the second set of logical address identifiers for the second subset of the set of data on the memory device may be established in the hypervisor mapping table in a second set of target entries for the target asset. The second subset of the set of data may be unlocked.

In embodiments, an ongoing utilization status for a second subset of the set of data on the memory device may be detected. In response to detecting the ongoing-utilization status, the ongoing-utilization status for the second subset of the set of data on the memory device may be monitored. Based on monitoring the ongoing-utilization status for the second subset of the set of data on the memory device, a second non-utilization status for the second subset of the set of data on the memory device may be detected. In response to detecting the second non-utilization status for the second subset of the set of data on the memory device, the second subset of the set of data on the memory device may be locked. A second set of logical address identifiers for the second subset of the set of data on the memory device may identified in the hypervisor mapping table in a second set of source entries for the source asset. The second set of logical address identifiers for the second subset of the set of data on the memory device may be established in the hypervisor mapping table in a second set of target entries for the target asset. The second subset of the set of data on the memory device may be unlocked.

In embodiments, an ongoing-utilization status may be detected for a second subset of the set of data on the memory device. In response to detecting the ongoing-utilization status for the second subset of the set of data on the memory device, the set of data on the memory device may be locked. A second set of logical address identifiers for the second subset of the set of data on the memory device may be identified in the hypervisor mapping table in a second set of source entries for the source asset. The second set of logical address identifiers for the second subset of the set of data on the memory device may be established in the hypervisor mapping table in a second set of target entries for the target asset. In response to establishing both the first set of logical address identifiers for the first subset of the set of data in the hypervisor mapping table in the first set of target entries for the target asset and the second set of logical address identifiers for the second subset of the set of data in the hypervisor mapping table in the second set of target entries for the target asset, the set of data on the memory device may be unlocked.

In embodiments, a global set of entries for the source asset having both the first set of source entries for the source asset and a remainder set of entries for the source asset may be analyzed in the hypervisor mapping-table. An ongoing-utilization status may be detected for a second subset of the set of data on the memory device corresponding to the remainder set of entries for the source asset. In response to establishing the first set of logical address identifiers for the first subset of the set of data on the memory device in the hypervisor mapping table in the first set of target entries for the target asset, performance of a migration operation for the second subset of the set of data on the memory device corresponding to the remainder set of entries for the source asset may be initiated.

In embodiments, a first expected resource usage for a set of rearrangement management operations may be computed. A second expected resource usage for a migration operation may be computed. The first and second expected resource usages may be compared. Based on the second expected resource usage exceeding the first expected resource usage, the set of rearrangement management operations may be performed. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
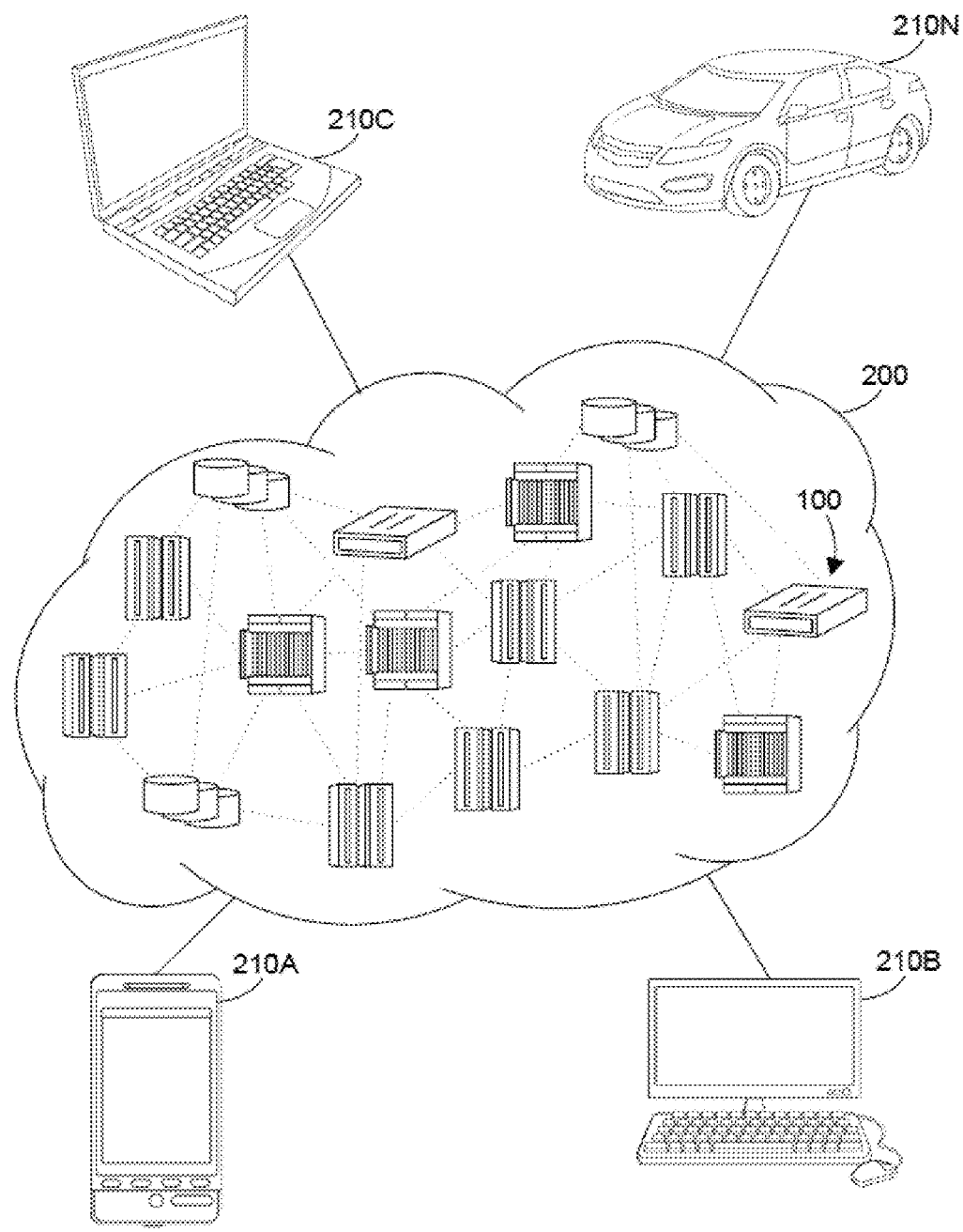
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
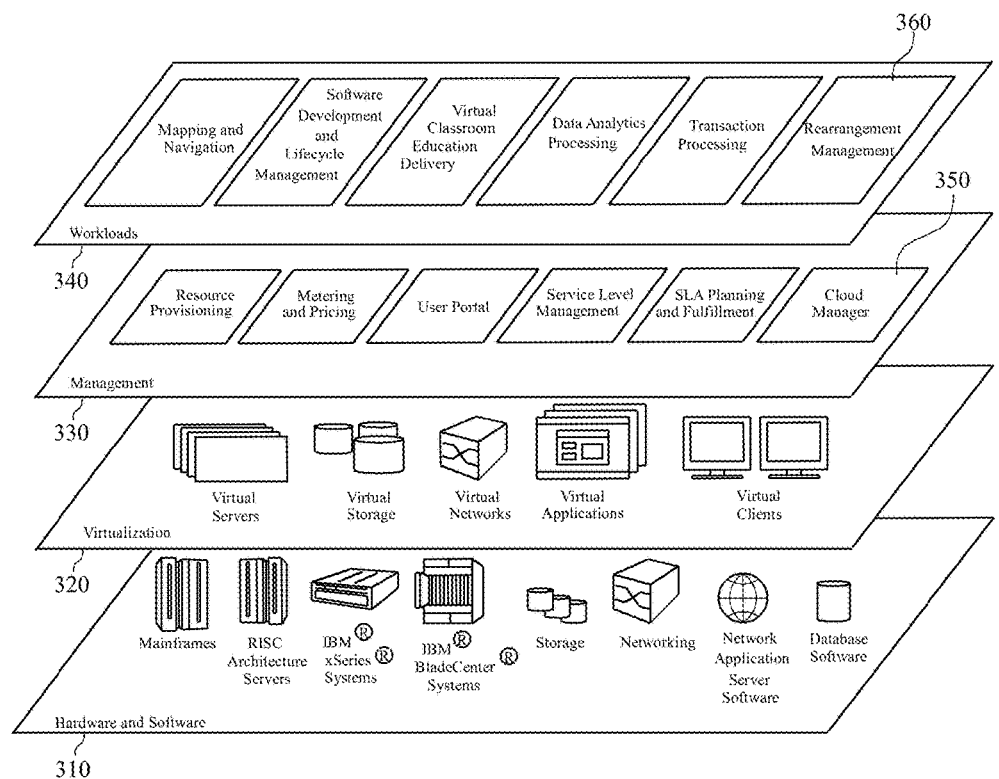
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and rearrangement management 360, which may be utilized as discussed in more detail below.

Figure 4:
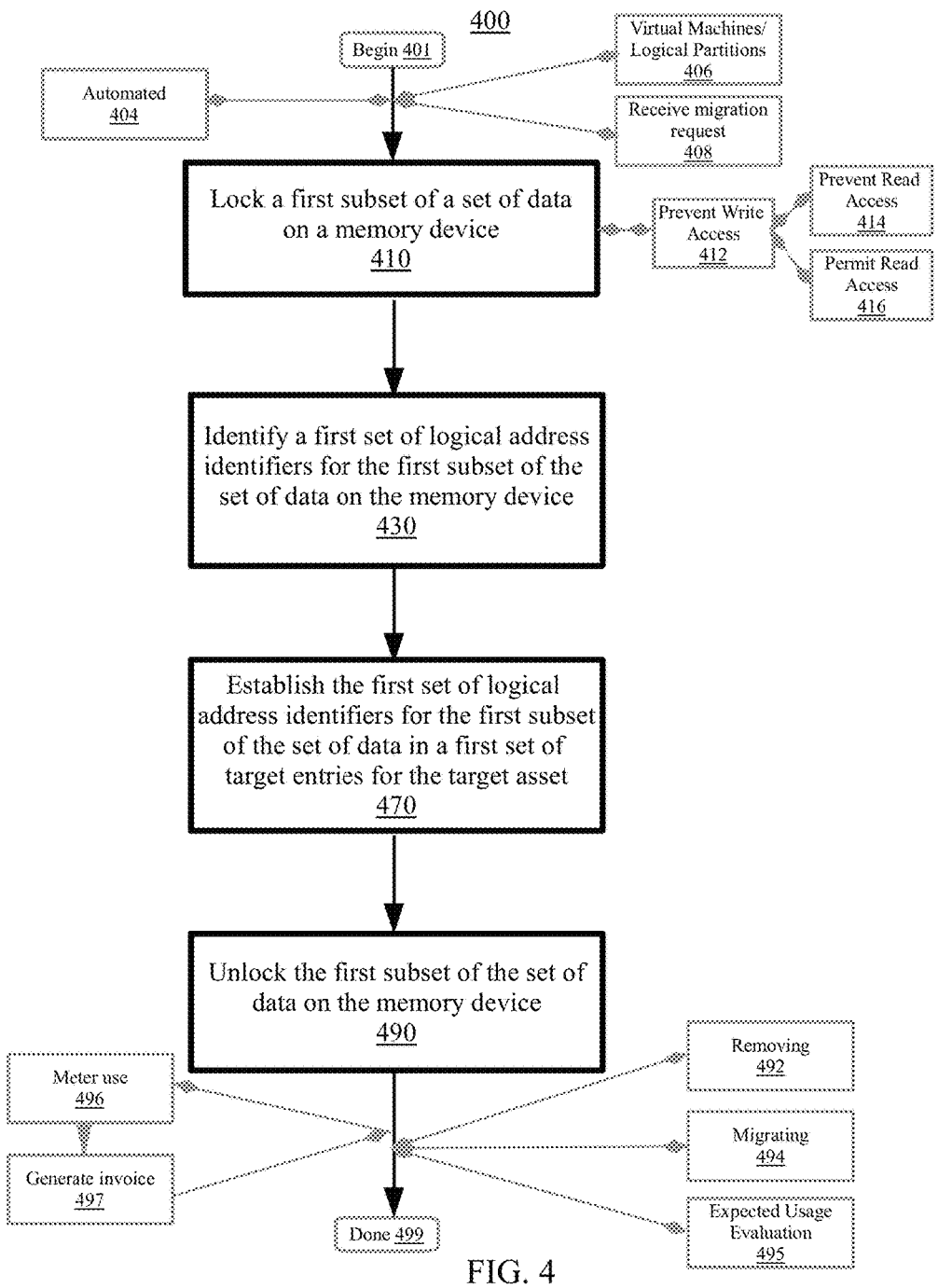
FIG. 4 is a flowchart illustrating a method of rearrangement management for a shared pool of configurable computing resources including a source asset, a target asset, and a memory device having a set of data, according to embodiments.

FIG. 4 is a flowchart illustrating a method 400 of rearrangement management for a shared pool of configurable computing resources including a source asset, a target asset, and a memory device having a set of data. Aspects of FIG. 4 relate to creating new logical mappings in a hypervisor mapping table (e.g., translation table) for physical memory pages of a source asset stored on a memory device such that the memory pages may be accessed by a target asset. In this way, the logical mapping (e.g., logical address identifiers) corresponding to a subset of the set of data (e.g., physical memory pages) may be changed from a source asset (e.g., logical partition, virtual machine) to a second target asset within the memory device. In embodiments, the memory device may include a shared memory device accessible by the source asset and the target asset. In embodiments, the memory device may include a non-shared memory device managed by a hypervisor. Leveraging logical address mapping techniques for data transfer may be associated with reduced application downtime and increased data transfer efficiency. The method 400 may begin at block 401.

In certain embodiments, the locking, the identifying, the establishing, the unlocking, and other steps described herein may each occur in an automated fashion without user intervention at block 404. In embodiments, the locking, the identifying, the establishing, the unlocking, and other steps described herein may be carried out by an internal rearrangement management module maintained in a persistent storage device of a computing node that also includes the memory device. In certain embodiments, the locking, the identifying, the establishing, the unlocking, and other steps described herein may be carried out by an external rearrangement management module hosted by a remote computing device or server (e.g., accessible via a subscription, usage-based, or other service model).

In embodiments, the source and target assets may include one or more of a set of virtual machines and a set of logical partitions at block 406. Generally, the source and target assets may include applications, physical hardware components, virtualized computing environments, or other physical or logical resources. In embodiments, the source and target assets may include a set of virtual machines. In embodiments, the set of virtual machines may include emulated computer system environments based on designated computer architectures and configured to perform one or more tasks or functions. For instance, the set of virtual machines may include system virtual machines configured to provide a complete system platform and operating system, or process virtual machines designed to run particular programs. In embodiments, the set of logical partitions may include subsets of a computer's hardware resources that are virtualized as a separate computer. In this way, a physical machine may be partitioned into multiple logical partitions, each logical partition hosting a separate operating system. Multiple logical partitions may access memory from a shared memory chip, or one partition may indirectly control memory controlled by a second partition while managing a process in that partition. In embodiments, the source and target assets may be managed by a single hypervisor (e.g., piece of computer software, firmware, or hardware that creates and runs virtual machines). Other types of source assets, target assets, and methods of managing them are also possible.

In embodiments, a request may be received to migrate a first subset of the set of data from the source asset to the target asset at block 408. Generally, receiving can include collecting, acquiring, obtaining, or otherwise accepting delivery of the request to migrate the first subset of the set of data. In embodiments, the request for migration may include a command or instruction to copy, transfer, deploy, allocate, or otherwise move the first subset of the set of data from one location (e.g., compute node) to another. In embodiments, the set of data may include a set of physical memory pages, information, processes, or other data resources stored on the memory device. Accordingly, the first subset of the set of data may include a portion of the set of data. As an example, the request for migration may indicate that a first set of memory pages is to be copied from a source asset to a target asset. In embodiments, the request may be received by a user or administrator of the shared pool of configurable computing resources. In embodiments, the request may be generated by a computing node (e.g., physical or virtual) in response to a triggering event (e.g., access request for the set of data from another compute node, resource balance operation) related to the first subset of the set of data. Other methods of receiving the migration request are also possible.

At block 410, a first subset of the set of data on the memory device may be locked. The first subset of the set of data may be locked with respect to modification. Generally, locking can include freezing, check-pointing, pausing, or otherwise preventing access or changes to the first subset of the set of data. As described herein, aspects of the disclosure relate to transferring the first subset of the set of data from a source asset to a target asset. Accordingly, in embodiments, it may be desirable to lock the first subset of the set of data to prevent modification to the first subset of the set of data to reduce the risk of transmission failure, errors, or other irregularities that may interrupt the data transfer process. In embodiments, locking may include configuring an access policy having a set of access permissions that govern the degree and type of access that is allowed with respect to the first subset of the set of data. For instance, in certain embodiments, locking may include limiting (e.g., reducing, preventing) the type of data management operations that certain programs or scripts are allowed to perform on the first subset of the set of data. As an example, locking may include limiting the read-access and write-access that is allowed with respect to the first subset of the set of data. As another example, locking may include permitting one or more particular data management operations (e.g., those processes that have been determined not interrupt the transfer process). Other methods of locking the first subset of the set of data are also possible.

In embodiments, locking the set of data on the memory device may include preventing a set of write-accesses to the set of data at block 412. Generally, preventing can include limiting, reducing, blocking, or forbidding write-access to the set of data. The set of write-accesses may include requests to edit, modify, rename, create, delete, copy, or perform other operations that affect the contents of the set of data. In embodiments, preventing the set of write-accesses may include configuring an access policy pertaining to the set of data. For instance, in embodiments, a hypervisor configured to manage the memory device may analyze the access policy for the set of data, identify one or more network devices, programs, virtual machines, or other physical or virtual components that have write-access to the set of data, and reconfigure the access policy to remove the write-access permissions. Other methods of preventing a set of write-accesses to the set of data are also possible.

In embodiments, locking the set of data on the memory device may include preventing a set of read-accesses to the set of data at block 414. Generally, preventing can include limiting, reducing, blocking, or forbidding read-access to the set of data. The set of read-accesses may include requests to view the contents of or other properties (e.g., file type, size, ownership, permissions) of the set of data. In embodiments, preventing the set of read-accesses may include denying requests for read-access to the set of data. As an example, in response to receiving a read-access request for the set of data, the hypervisor configured to manage the memory device may reject the read-access request and prevent the source of the read-access request from accessing the set of data. Other methods of preventing the set of read-accesses with respect to the set of data are also possible.

In embodiments, locking the set of data on the memory device may include permitting a set of read-accesses to the set of data at block 416. Generally, permitting can include allowing, admitting, granting, enabling, or authorizing the set of read-accesses to the set of data. As described herein, the set of read-accesses may include requests to view the contents or other properties (e.g., file type, size, ownership, permissions) of the set of data. In embodiments, permitting the set of read-access may include analyzing the set of read-accesses and determining that the set of read-access requests will not adversely affect transfer of the first subset of the set of data from the source asset to the target asset. As an example, it may be determined that the set of read-access requests relate to another subset of the set of data other than the first subset (e.g., the subset being transferred). Other methods of permitting the set of read-access requests with respect to the set of data are also possible.

At block 430, a first set of logical address identifiers for the first subset of the set of data on the memory device may be identified. The first set of logical address identifiers may be identified in a hypervisor mapping table in a first set of source entries for the source asset. Generally, identifying can include discovering, recognizing, discerning, detecting, or otherwise ascertaining the first set of logical address identifiers. In embodiments, identifying may include searching the memory device and locating a set of logical address identifiers that correspond to the first subset of the set of data. In embodiments, the set of logical address identifiers may include a label, set of integers, symbols, or other characters that designate a location or register where the first subset of the set of data is stored within the memory device. The set of logical address identifiers may be stored in a first set of source entries in a hypervisor mapping table. In embodiments, the hypervisor mapping table may include a database, index, or other repository of data that stores and maintains information including the saved location of particular data sets for different computing assets (e.g., the source asset and the target asset). For instance, the hypervisor mapping table may maintain one or more sets of source entries that include data entries and registered addresses for data sets pertaining to (e.g., managed by, used by) the source asset. In embodiments, identifying the first set of logical address identifiers may include monitoring the hypervisor mapping table and detecting the first set of logical address identifiers. Other methods of identifying the first set of logical address identifiers for the first subset of the set of data on the memory device are also possible.

Consider the following example. In embodiments, identifying the first set of logical address identifiers for the first subset of the set of data on the memory device may include querying the hypervisor for the first set of logical address identifiers. For instance, an address identifier request may be submitted to the hypervisor inquiring as to the logical address identifiers for a particular data set (e.g., the first subset of the set of data). In embodiments, the address identifier request may include a data set identifier that specifies the particular data set for which the logical address identifiers are requested. Accordingly, the hypervisor may utilize the data set identifier to search the hypervisor mapping table and locate the first set of logical address identifiers. In response to locating the first set of logical address identifiers, the hypervisor may answer the address identifier request by responding with the identified first set of logical address identifiers (e.g., Data Set 1 is stored at E:\\UsersTrofiles\Shared). Other methods of identifying the first set of logical address identifiers for the first subset of the set of data on the memory device are also possible.

At block 470, the first set of logical address identifiers for the first subset of the set of data may be established. The first set of logical address identifiers may be established in the hypervisor mapping table in a first set of target entries for the target asset. Aspects of the disclosure, in embodiments, relate to facilitating access between the target asset and the first subset of the set of data by providing the first set of logical address identifiers to the target asset. Generally, establishing can include inserting, storing, generating, including, embedding, or otherwise including the first set of logical address identifiers in the first set of target entries for the target asset. As described herein, the first set of target entries may include data entries and registered addresses for data sets pertaining to (e.g., managed by, used by) the target asset. The first set of target entries may be maintained within the hypervisor mapping table. In embodiments, establishing may include replicating (e.g., copying) the first set of logical address identifiers stored in the first set of source entries, and providing them (e.g., saving, storing, inserting, pasting) them in the first set of target entries for the target asset in the hypervisor mapping table. For instance, a new subset of data entries within the set of target entries may be created, and the first set of logical address identifiers may be inserted into the new subset. Other methods of establishing the first set of logical address identifiers in the first set of target entries in the hypervisor mapping table are also possible.

Consider the following example. In embodiments, establishing the first set of logical address identifiers in the first set of target entries in the hypervisor mapping table may include using a database management tool to transfer the first set of logical address identifiers from the first set of source entries to the first set of target entries in the hypervisor mapping table. For instance, the database management tool may be configured to copy the first set of logical address identifiers from the first set of target entries, and paste (or move) them to a designated location of the first set of target entries in the hypervisor mapping table. In embodiments, the database management tool may be configured to perform a verification operation to confirm that the correct first set of logical address identifiers have been copied and inserted in the designated location within the first set of target entries. Accordingly, in response to establishing the first set of logical address identifiers in the first set of target entries, the target asset may make use of the first set of logical address identifiers to access the first subset of the set of data on the memory device. Other methods of establishing the first set of logical address identifiers in the first set of target entries in the hypervisor mapping table are also possible.

At block 490, the first subset of the set of data on the memory device may be unlocked. The first subset of the set of data may be unlocked with respect to modification. Generally, unlocking can include unfreezing, resuming, opening, allowing, or otherwise permitting access or changes to the first subset of the set of data. As described herein, aspects of the disclosure relate to locking the first subset of the set of data to prevent modifications that may impact the data transfer process. Accordingly, once the data transfer process (e.g., establishment of the first set of logical address identifiers) has completed, it may be desirable to unlock the first subset of the set of data to allow for normal data management operations to resume. In embodiments, unlocking may include configuring an access policy having a set of access permissions that govern the degree and type of access that is allowed with respect to the first subset of the set of data. For instance, in embodiments, unlocking may include approving (e.g., authorizing) one or more data management operations that were locked during the data transfer process. As an example, unlocking may include permitting read-access to the first subset of the set of data. As another example, unlocking may include permitting write-access to the first subset of the set of data. As such, data management operations including content viewing, editing, updating, creation, deletion, and the like may be performed. Other methods of unlocking the first subset of the set of data are also possible.

In embodiments, the first set of logical address identifiers for the first subset of the set of data on the memory device may be removed from the first set of source entries for the source asset in the hypervisor mapping table at block 492. Generally, removing can include deleting, clearing, erasing, extracting, or otherwise eliminating the first subset of the set of data from the first set of source entries in the hypervisor mapping table. Aspects of the disclosure relate to the recognition that, in embodiments, it may be desirable to completely transfer management responsibilities for the first subset of the set of data from the source asset to the target asset. Accordingly, in response to establishing the first set of logical address identifiers in the first set of target entries, the first set of logical address identifiers may be removed from the first set of source entries. In embodiments, removing may include using a database management tool to delete the first set of logical address identifiers from the first set of source entries in the hypervisor mapping table after establishment of the first set of logical address identifiers in the first set of target entries for the target asset. Other methods of removing the first set of logical address identifiers are also possible.

In embodiments, the first subset of the set of data may be migrated at block 494. The first subset of the set of data may be migrated from the source asset to the target asset. In embodiments, the first subset of the set of data may be migrated from the source asset to the target asset in response to receiving a request to migrate (e.g., as described at block 408). Generally, migrating can include transferring, moving, allocating, transmitting, relocating, sending, or deploying the first subset of the set of data. As described herein, aspects of the disclosure relate to facilitating access between the target asset and the first subset of the set of data by establishing the first set of logical address identifiers in the set of target entries for the target asset, such that the target asset may use the first set of logical address identifiers to locate the first subset of the set of data on the memory device. In embodiments, aspects of the disclosure relate to direct transfer of the first subset of the set of data from the source asset to the target asset. Migrating may include relocating the first subset of the set of data from a location managed by the source asset to a location managed by the target asset. For example, migrating may include transferring the first subset of the set of data from a first partition of the memory device corresponding to the source asset to a second partition of the memory device corresponding to the target asset. Other methods of migrating the first subset of the set of data from the source asset to the target asset are also possible.

In embodiments, aspects of the disclosure relate to performing an expected resource usage evaluation for a set of rearrangement management operations and a migration operation at block 495. Aspects of the disclosure, in embodiments, relate to assessing the amount of computing resources expected to be used by the set of rearrangement management operations with respect to the amount of computing resources expected to be used by a migration operation to evaluate the efficiency of the data transfer operation. In embodiments, the expected resource usage evaluation may include computing (e.g., calculating, formulating, ascertaining) a first expected resource usage (e.g., amount of resources predicted to be utilized) for a set of rearrangement management operations (e.g., the locking, identifying, establishing, unlocking, and other steps described herein), and computing a second expected resource usage for a migration operation (e.g., direct/conventional data transfer between the source asset and the target asset). In embodiments, the first and second expected resource usages may include quantitative estimates for different computing resources (e.g., processing resources, memory resources, network bandwidth) that will be used to complete the set of rearrangement management operations and the migration operation, respectively. In embodiments, the first and second expected resource usages may be compared (e.g., correlated, contrasted, analyzed, examined with respect to one another). Based on the comparison, it may be determined that the second expected resource usage exceeds the first expected resource usage (e.g., it may be ascertained that the first expected resource usage is 400 Megabytes and that the second expected resource usage is 600 Megabytes). In response to determining that the second expected resource usage exceeds the first expected resource usage, the set of rearrangement management operations may be performed (e.g., the set of rearrangement management operations is more resource efficient/uses less resources than the migration operation). Other methods of evaluating the expected resource usages of the set of rearrangement management operations and the migration operation are also possible.

In embodiments, use of the rearrangement management may be metered at block 496. Metering can include measuring, tracking, documenting, recording, or calculating the degree or extent of the utilization of the rearrangement management operations. The degree of utilization may be calculated based on the number of times rearrangement management operations were utilized (e.g., 10 times, 100 times), the amount of data managed using rearrangement management operations, application configurations (e.g., computer configurations, rearrangement management parameters), resource usage (e.g., data processed by rearrangement management operations) or other means. Based on the metered use, an invoice may be generated at block 497. The invoice may include a bill, fee, service charge, or other itemized breakdown specifying compensation for the usage of the rearrangement management. Subscription based models are also possible.

Consider the following example. A source asset including a first logical partition may manage a set of physical memory pages on a shared memory device. The set of physical memory pages may be associated with a first set of logical address identifiers that indicate the storage location of the set of physical memory pages. For instance, the first set of logical address identifiers may include a storage location of K:\\ProgramFiles\Application8901\Job32. In embodiments, the first set of logical address identifiers for the set of physical memory pages may be maintained in a first set of source entries for the first logical partition in a hypervisor mapping table. As described herein, it may be desirable to provide a second logical partition (e.g., target asset) with access to the set of physical memory pages on the shared memory device. Accordingly, the set of physical memory pages may first be locked to prevent interruption during the transfer process. The first set of logical address identifiers (e.g., the storage location K:\\ProgramFiles\Application8901\Job32) may be identified within the set of source entries of the hypervisor mapping table, and established in a first set of target entries for the target asset in the same hypervisor mapping table. After establishment of the first set of logical address identifiers, the set of physical memory pages may be unlocked. Accordingly, the second logical partition may access the set of physical memory pages on the shared memory device using the set of logical address identifiers.

Method 400 concludes at block 499. Aspects of method 400 may provide performance or efficiency benefits for rearrangement management. For example, aspects of method 400 may have positive impacts with respect to facilitating access to a first subset of a set of data (e.g., by a target asset). As described herein, the locking, the identifying, the establishing, the unlocking, and other steps described herein may each occur in an automated fashion without user invention. Altogether, leveraging logical address mapping techniques for data transfer may be associated with performance or efficiency benefits (e.g., reduced application downtime, increased data transfer efficiency, computing resource efficiency).

Figure 5:
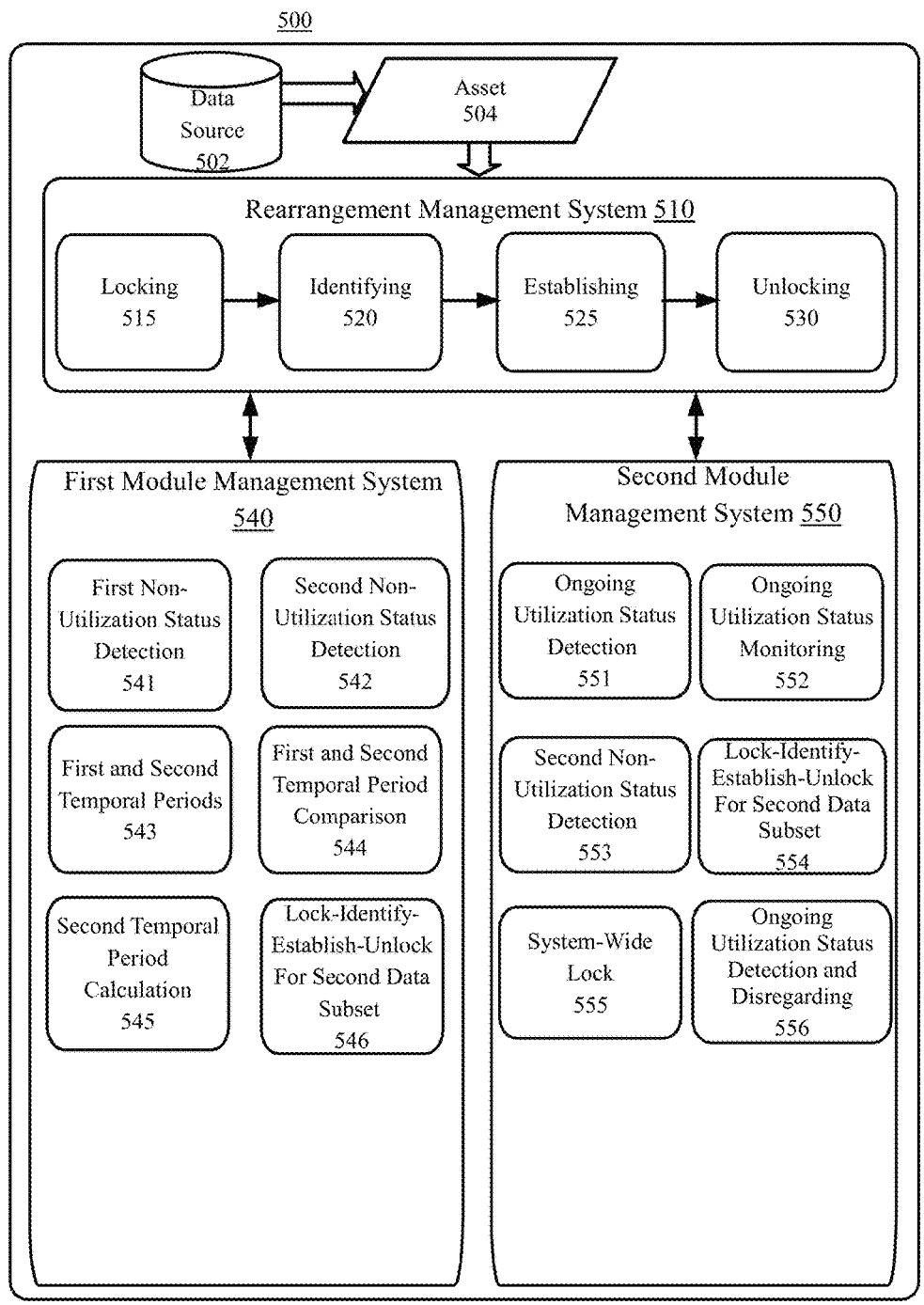
FIG. 5 shows an example system for rearrangement management for a shared pool of configurable computing resources including a source asset, a target asset, and a memory device having a set of data, according to embodiments.

FIG. 5 shows an example system 500 for rearrangement management for a shared pool of configurable computing resources including a source asset, a target asset, and a memory device having a set of data. Aspects of FIG. 5 are directed toward performing rearrangement management operations for one or more subsets of data based on a utilization status (e.g., non-utilization status, ongoing utilization status) for the subsets of data. In embodiments, the example system 500 may include a data source 502 (e.g., storage device, database, memory device) that provides an asset 504 (e.g., source asset, target asset). The asset 504 may be configured to be processed by the rearrangement management system 510. In embodiments, the rearrangement management system 510 may include a locking module 515 to lock a first subset of the set of data, an identifying module 520 configured to identify a first set of logical address identifiers for the first subset of the set of data, an establishing module 525 configured to establish the first set of logical address identifiers in a first set of target entries in a hypervisor mapping table, and an unlocking module 530 configured to unlock the first subset of the set of data on the memory device. The rearrangement management system 510 may be communicatively connected with first module management system 540 and a second module management system 550 that each include one or more modules for performing other operations related to rearrangement management.

In embodiments, the first module management system 540 may include a plurality of modules configured to facilitate rearrangement management for a subset of a set of data associated with a non-utilization status. In embodiments, a first non-utilization status may be detected for the first subset of the set of data on the memory device at module 541. Generally, detecting can include sensing, discovering, recognizing, or otherwise ascertaining the first non-utilization status for the first subset of the set of data. The non-utilization status may include a state or condition that indicates that the first subset of the set of data is not currently being accessed, processed, executed, or otherwise used. For instance, detecting the non-utilization status may include analyzing a task manager or list of active processes, and ascertaining that the first subset of the set of data is not presently in use. In embodiments, a second non-utilization status may be detected for a second subset of the set of data at module 542. The second subset of the set of data may include a portion of the set of data that is different than the first subset of the set of data. In certain embodiments, the second subset and the first subset of the set of data may be substantially similar, or share one or more files. The second non-utilization status may indicate that the second subset of the set of data is not currently being accessed, processed, executed, or otherwise used. In embodiments, detecting the second non-utilization status may substantially correspond to detecting the first non-utilization status. Other methods of detecting the first and second non-utilization statuses are also possible.

In embodiments, the first non-utilization status may have a first temporal period of non-utilization, and the second non-utilization status may have a second temporal period of non-utilization at module 543. Generally, the first and second temporal periods of non-utilization may include durations of time for which the first and second subsets of the set of data, respectively, have not been accessed or otherwise utilized (e.g., e.g., 10 minutes, 1 hour, 3 days, 2 months). In embodiments, determining the first and second temporal periods may include accessing usage logs containing usage statistics for both the first and second subsets of the set of data, and ascertaining the length of time that the first and second subsets of the set of data have not been accessed (e.g., based on last recorded usage date/time). As an example, in certain embodiments, the first subset of the set of data may have a first temporal period of non-utilization of 6 days, and the second subset of the set of data may have a second temporal period of non-utilization of 9 days. Other types of temporal periods of non-utilization are also possible.

In embodiments, the first and second temporal periods of non-utilization may be compared at module 544. Generally, comparing can include analyzing, contrasting, juxtaposing, evaluating, or otherwise assessing the first and second temporal periods of non-utilization. In embodiments, comparing may include examining the first and second temporal periods of non-utilization with respect to each other. For instance, the first temporal period of non-utilization of 6 days may be assessed with respect to the second temporal period of non-utilization of 9 days. In embodiments, it may be calculated that the second temporal period of non-utilization exceeds the first temporal period of non-utilization at module 545. Generally, calculating can include computing, formulating, detecting, verifying, or otherwise determining that the second temporal period of non-utilization exceeds the first temporal period of non-utilization. For instance, with reference to the previous example, calculating may include ascertaining that the second temporal period of non-utilization of 9 days exceeds the first temporal period of non-utilization of 6 days. Other methods of comparing the first and second temporal periods of non-utilization and calculating that the second temporal period of non-utilization exceeds the first temporal period of non-utilization are also possible.

In embodiments, aspects of the disclosure relate to prioritizing (e.g., expediting, performing first) data transfer for those subsets of the set of data that have relatively smaller temporal periods of non-utilization (e.g., those subsets of the set of data that have been accessed, processed, or used more frequently). For instance, in response to calculating that the second temporal period of non-utilization (e.g., 11 hours) exceeds the first temporal period of non-utilization (e.g., 5 hours), one or more rearrangement management operations (e.g., locking, identifying, establishing) may be performed for the first subset of the set of data (e.g., corresponding to the first temporal period of non-utilization). In response to establishing the first set of logical address identifiers for the first subset of the set of data in the first set of target entries for the target asset in the hypervisor mapping table, one or more rearrangement management operations may be performed for the second subset of the set of data at module 546. In embodiments, the second subset of the set of data may be locked, a second set of logical address identifiers for the second subset of the set of data may be identified in a second set of source entries for the source asset in the hypervisor mapping table, the second set of logical address identifiers may be established in a second set of target entries for the target asset in the hypervisor mapping table, and the second subset of the set of data may be unlocked. Other methods of rearrangement management based on the non-utilization status are also possible.

In embodiments, the second module management system 550 may include a plurality of modules configured to facilitate rearrangement management for a subset of a set of data associated with an ongoing-utilization status. In embodiments, a first ongoing-utilization status may be detected for a second subset of the set of data on the memory device at module 551. Generally, detecting can include sensing, discovering, recognizing, or otherwise ascertaining the ongoing-utilization status for the second subset of the set of data. The ongoing-utilization status may include a state or condition that indicates that the second subset of the set of data is currently being accessed, processed, executed or otherwise used. In embodiments, detecting the ongoing-utilization status may include analyzing a task manager or list of active processes, and ascertaining that the second subset of the data is currently active, engaged, or otherwise utilized. In embodiments, the ongoing-utilization status for the second subset of the set of data may be monitored at module 552. Generally, monitoring may include observing, surveying, overseeing, or examining the ongoing-utilization status of the second subset of the set of data. In embodiments, monitoring may include continuously overseeing the utilization status of the second subset of the set of data to detect changes in the utilization level of the second subset of the set of data. In embodiments, based on monitoring the ongoing-utilization status for the second subset, a second non-utilization status for the second subset of the set of data may be detected at module 553. As described herein, detecting can include sensing, recognizing, discovering, or ascertaining that the second subset of the set of data has transitioned from the ongoing-utilization status to the second non-utilization status (e.g., an indication that the second subset of the set of data is not currently being accessed, processed, executed, or otherwise used). Other methods of detecting the ongoing-utilization status, monitoring the ongoing-utilization status, and detecting the second non-utilization status are also possible.

In embodiments, aspects of the disclosure relate to performing rearrangement management operations for a subset of a set of data in response to detecting that the subset of data is not in use. Accordingly, in response to detecting that the ongoing-utilization status of the second subset of the set of data had changed to a non-utilization status, one or more rearrangement management operations may be performed on the second subset of the set of data at module 554. In embodiments, in response to detecting the second non-utilization status for the second subset of the set of data, the second subset of the set of data may be locked with respect to modification, a second set of logical address identifiers for the second subset of the set of data may be identified in a second set of source entries for the source asset in a hypervisor mapping table, the second set of logical address identifiers may be established in a second set of target entries for the target asset in the hypervisor mapping table, and the second subset of the set of data may be unlocked. Other methods of rearrangement management based on the ongoing-utilization status and the non-utilization status are also possible.

In embodiments, aspects of the disclosure relate to performing a system-wide lock of the set of data at module 555. In embodiments, the system-wide lock may facilitate transfer of the first and second subsets of the set of data. The system-wide lock may be performed when a first subset of the set of data has a first non-utilization status. In embodiments, performing the system-wide lock may include detecting an ongoing-utilization status for a second subset of the set of data on the memory device. As described herein, detecting can include sensing, discovering, recognizing, or ascertaining that the second subset of the set of data is currently being accessed, processed, executed or otherwise used. In response to detecting the ongoing utilization status for the second subset of the set of data on the memory device, the set of data on the memory device may be locked (e.g., frozen, check-pointed, prevented from changes) with respect to modification. In embodiments, the set of data may include all of the data on the memory device, including the first subset of the set of data, the second subset of the set of data, as well as other subsets and partitions of the set of data. In response to locking the set of data, a second set of logical address identifiers for the second subset of the set of data may be identified in a second set of source entries in the hypervisor mapping table, and the second set of logical address identifiers for the second subset of the set of data may be established in the second set of target entries for the target asset in the hypervisor mapping table. In embodiments, in response to establishing both the first set of logical address identifiers for the first set of the set of data (e.g., in the first set of target entries for the target asset) and the second set of logical address identifiers for the second set of the set of data (e.g., in the second set of target entries for the target asset), the set of data on the memory device may be unlocked. Other methods of performing the system-wide lock are also possible.

In embodiments, aspects of the disclosure relate to excluding (e.g., skipping over) certain subsets of the set of data from the rearrangement management operations based on the ongoing utilization status (e.g., it may be desirable to allow subsets of the set of data that are in use to finish processing before being transferred) at module 556. In embodiments, an ongoing utilization status for a second subset of the set of data on the memory device may be detected. Detecting the ongoing utilization status may include sensing, discovering, recognizing, or ascertaining that the second subset of the set of data is currently being accessed, processed, executed or otherwise used. In response to detecting the ongoing-utilization status for the second subset of the set of data, the second subset of the set of data may be disregarded. Generally, disregarding can include omitting, ignoring, discarding, or skipping the second subset of the set of data. In embodiments, disregarding may include excluding the second subset from the rearrangement management process. Other methods of detecting the ongoing-utilization status and disregarding the second subset of the set of data are also possible.

Figure 6:
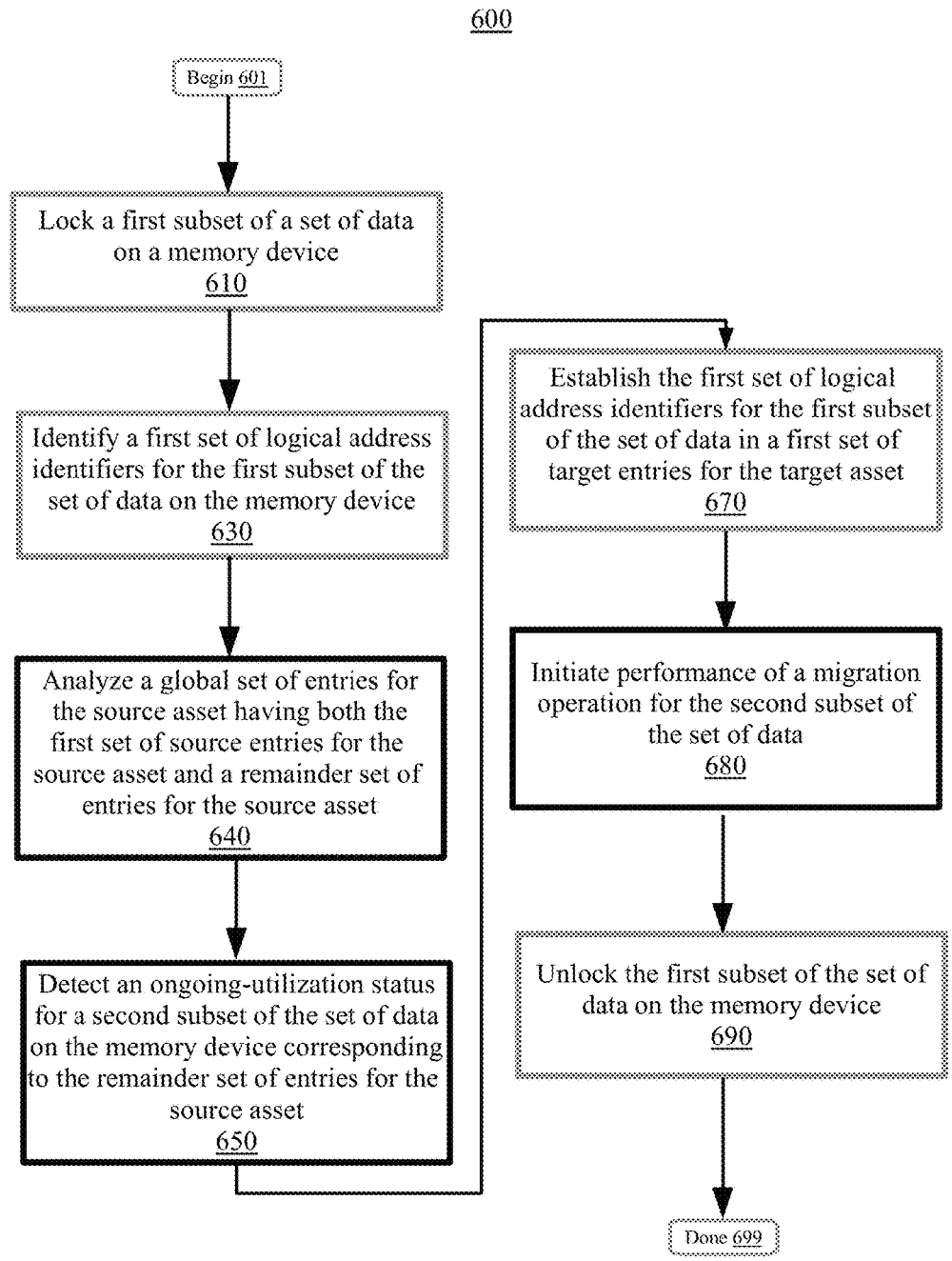
FIG. 6 is a flowchart illustrating a method of rearrangement management for a shared pool of configurable computing resources including a source asset, a target asset, and a memory device having a set of data, according to embodiments.

FIG. 6 is a flowchart illustrating a method 600 of rearrangement management for a shared pool of configurable computing resources including a source asset, a target asset, and a memory device having a set of data. Aspects of FIG. 6 relate to performing rearrangement management operations for a first subset of the set of data (e.g., a subset that is not currently in use/processing), and performing a migration operation for a second subset of the set of data. In embodiments, aspects of the method 600 may substantially correspond to embodiments described herein and in the FIGS. 1-7. At block 610, a first subset of a set of data on a memory device may be locked. At block 630, a first set of logical address identifiers for the first subset of the set of data on the memory device may be identified. At block 670, the first set of logical address identifiers for the first subset of the set of data may be established in a first set of target entries for the target asset in a hypervisor mapping table. At block 690, the first subset of the set of data on the memory device may be unlocked. The method 600 may begin at block 601.

In embodiments, a global set of entries for the source asset may be analyzed at block 640. The global set of entries may be analyzed in the hypervisor mapping table. Generally, analyzing can include assessing, evaluating, parsing, inspecting, or examining the global set of entries in the hypervisor mapping table. The global set of entries may include all the data entries in the hypervisor mapping table that correspond to the source asset. In embodiments, the global set of entries may include both the first set of source entries (e.g., portion of the source entries that correspond to the first set of logical address identifiers) for the source asset as well as a remainder set of entries for the source asset (e.g., those source entries that are not included in the first set of source entries). In embodiments, analyzing the global set of entries may include determining the utilization status of the global set of entries. For instance, analyzing may include determining that a first subset of the global set of entries is not currently in use (e.g., has a non-utilization status). Other methods of analyzing the global set of entries are also possible.

In embodiments, an ongoing-utilization status may be detected for a second subset of the set of data on the memory device at block 650. The second subset of the set of data may correspond to the remainder set of entries for the source asset. Generally, detecting can include sensing, discovering, recognizing, or otherwise ascertaining the ongoing-utilization status for the second subset of the set of data. As described herein, the ongoing-utilization status may include a state or condition that indicates that the second subset of the set of data is currently being accessed, processed, executed or otherwise used. For example, a second subset of the set of data that is currently being edited by a user may be considered to have an ongoing-utilization status. In embodiments, detecting may include using a system monitoring tool to ascertain that the second subset of the set of data is being used as part of one or more system tasks, is being accessed by a user, undergoing an update, or the like. Other methods of detecting the ongoing-utilization status for the second subset of the set of data are also possible.

In embodiments, a migration operation for the second subset of the set of data on the memory device may be initiated at block 680. The migration operation may be initiated in response to establishing the first set of logical address identifiers for the first subset of the set of data in the first set of target entries. Generally, initiating can include executing, instantiating, starting, or launching the migration operation for the second subset of the set of data that corresponds to the remainder set of entries for the source asset. In embodiments, the migration operation may include a procedure to transfer, move, allocate, transmit, send, or deploy the second subset of the set of data to another location (e.g., the target asset). In embodiments, migrating may include performing a conventional data transfer operation to relocate the second subset of the set of data from a first partition of the memory device corresponding to the source asset to a second partition of the memory device corresponding to the target asset. Other methods of initiating performance of the migration operation for the second subset of the set of data are also possible.

Method 600 concludes at block 699. Aspects of method 600 may provide performance or efficiency benefits for rearrangement management. For example, aspects of method 600 may have positive impacts with respect to facilitating access to a global set of entries for a source asset (e.g., by a target asset). As described herein, the locking, the identifying, the analyzing, the detecting, the establishing, the initiating, the unlocking, and other steps described herein may each occur in an automated fashion without user invention. Altogether, leveraging logical address mapping techniques for data transfer may be associated with performance or efficiency benefits (e.g., reduced application downtime, increased data transfer efficiency, computing resource efficiency).

Figure 7:
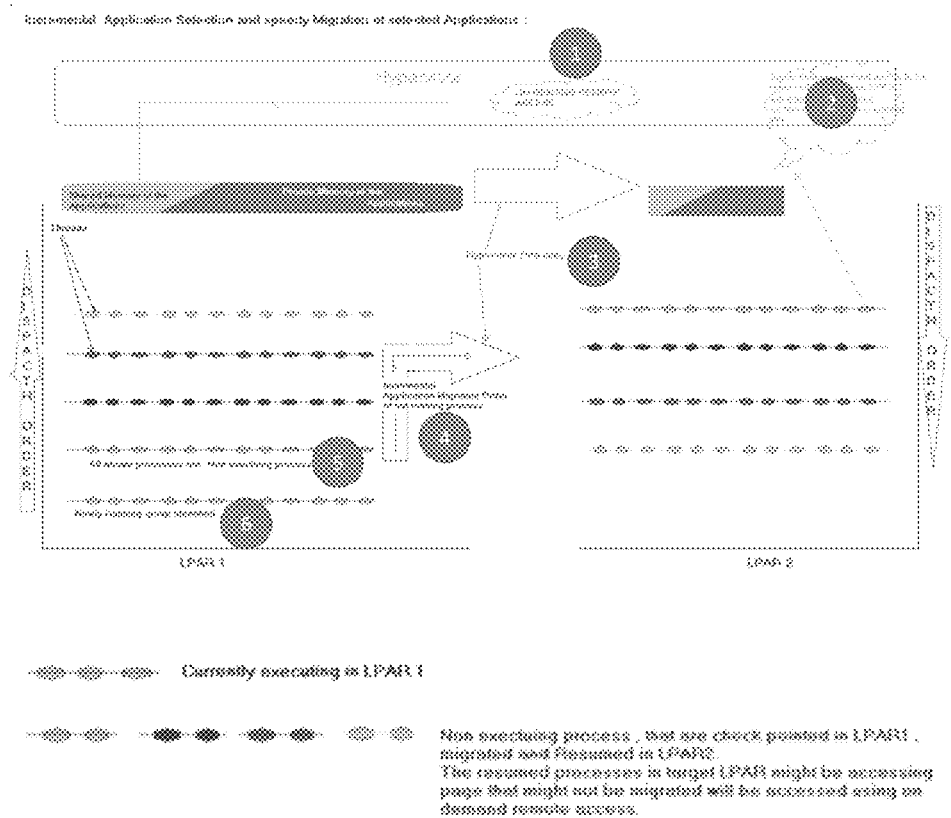
FIG. 7 is a diagram illustrating a method of rearrangement management for a shared pool of configurable computing resources including a source asset, a target asset, and a memory device having a set of data, according to embodiments.

FIG. 7 is a diagram illustrating a method 700 of rearrangement management for a shared pool of configurable computing resources including a source asset, a target asset, and a memory device having a set of data. Aspects of the method 700 relate to managing access to a subset of a set of data from a source logical partition (LPAR) and a target logical partition based on a process dispatch order. An operating system (e.g., of a logical partition, compute node) may identify newly dispatched (e.g., executed) processes and exclude (e.g., disregard) sets of data corresponding to the processes from rearrangement management operations (e.g., so as to not interrupt active processes). Non-dispatched processes (e.g., data associated with a non-utilization status) of the source logical partition may be locked, and a first set of logical address identifiers for sets of data corresponding to the non-dispatched processes may be established in the hypervisor mapping table for the target logical partition. Logical address identifiers for processes that are shared across dispatched and non-dispatched threads may be locked, identified, and established in the hypervisor mapping table for the target logical partition upon completion. In certain embodiments, once logical address identifiers for all non-dispatched processes have been established for the target asset, the remaining processes may be migrated (e.g., using conventional data migration techniques.) Other methods of rearrangement management are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of rearrangement management for a shared pool of configurable computing resources including a source asset, a target asset, and a memory device having a set of data, the method comprising:
    locking, with respect to modification, a first subset of the set of data on the memory device;
    identifying, in a hypervisor mapping table in a first set of source entries for the source asset, a first set of logical address identifiers for the first subset of the set of data on the memory device;
    establishing, in the hypervisor mapping table in a first set of target entries for the target asset, the first set of logical address identifiers for the first subset of the set of data on the memory device;
    analyzing, in the hypervisor mapping-table, a global set of entries for the source asset having both the first set of source entries for the source asset and a remainder set of entries for the source asset;
    detecting, for a second subset of the set of data on the memory device corresponding to the remainder set of entries for the source asset, an ongoing-utilization status;
    in response to establishing the first set of logical address identifiers for the first subset of the set of data on the memory device, initiating performance of a migration operation for the second subset of the set of data on the memory device corresponding to the remainder set of entries for the source asset; and
    unlocking, with respect to modification, the first subset of the set of data on the memory device.

2. The method of claim 1, further comprising:
    removing, in the hypervisor mapping table in the first set of source entries for the source asset, the first set of logical address identifiers for the first subset of the set of data on the memory device.

3. The method of claim 1, wherein the source and target assets are selected from a group consisting of a set of virtual machines and a set of logical partitions.

4. The method of claim 1, further comprising:
    detecting, for the first subset of the set of data on the memory device, a first non-utilization status.

5. The method of claim 4, wherein the first non-utilization status has a first temporal period of non-utilization, further comprising:
    detecting, for a second subset of the set of data on the memory device, a second non-utilization status having a second temporal period of non-utilization;
    comparing the first and second temporal periods of non-utilization
    calculating that the second temporal period of non-utilization exceeds the first temporal period of non-utilization; and
    in response to establishing, in the hypervisor mapping table in the first set of target entries for the target asset, the first set of logical address identifiers for the first subset of the set of data on the memory device:
  locking, with respect to modification, the second subset of the set of data on the memory device,
  identifying, in the hypervisor mapping table in a second set of source entries for the source asset, a second set of logical address identifiers for the second subset of the set of data on the memory device,
  establishing, in the hypervisor mapping table in a second set of target entries for the target asset, the second set of logical address identifiers for the second subset of the set of data on the memory device, and
  unlocking, with respect to modification, the second subset of the set of data on the memory device.

6. The method of claim 4, further comprising:
detecting, for a second subset of the set of data on the memory device, an ongoing-utilization status;
monitoring, in response to detecting the ongoing-utilization status, the ongoing-utilization status for the second subset of the set of data on the memory device;
detecting, based on monitoring the ongoing-utilization status for the second subset of the set of data on the memory device, a second non-utilization status for the second subset of the set of data on the memory device;
in response to detecting the second non-utilization status for the second subset of the set of data on the memory device:
  locking, with respect to modification, the second subset of the set of data on the memory device,
  identifying, in the hypervisor mapping table in a second set of source entries for the source asset, a second set of logical address identifiers for the second subset of the set of data on the memory device,
  establishing, in the hypervisor mapping table in a second set of target entries for the target asset, the second set of logical address identifiers for the second subset of the set of data on the memory device, and
  unlocking, with respect to modification, the second subset of the set of data on the memory device.

7. The method of claim 4, further comprising:
detecting, for a second subset of the set of data on the memory device, an ongoing-utilization status;
in response to detecting the ongoing-utilization status for the second subset of the set of data on the memory device:
  locking, with respect to modification, the set of data on the memory device;
  identifying, in the hypervisor mapping table in a second set of source entries for the source asset, a second set of logical address identifiers for the second subset of the set of data on the memory device,
  establishing, in the hypervisor mapping table in a second set of target entries for the target asset, the second set of logical address identifiers for the second subset of the set of data on the memory device, and
  unlocking, with respect to modification, the set of data on the memory device in response to establishing both the first set of logical address identifiers for the first subset of the set of data on the memory device in the hypervisor mapping table in the first set of target entries for the target asset and the second set of logical address identifiers for the second subset of the set of data on the memory device in the hypervisor mapping table in the second set of target entries for the target asset.

8. The method of claim 1, further comprising:
detecting, for a second subset of the set of data on the memory device, an ongoing-utilization status; and
disregarding the second subset of the set of data on the memory device.

9. The method of claim 1, wherein locking, with respect to modification, the set of data on the memory device includes:
preventing a set of write-accesses to the set of data.

10. The method of claim 9, wherein locking, with respect to modification, the set of data on the memory device includes:
preventing a set of read-accesses to the set of data.

11. The method of claim 9, wherein locking, with respect to modification, the set of data on the memory device includes:
permitting a set of read-accesses to the set of data.

12. The method of claim 1, further comprising:
receiving a request to migrate the first subset of the set of data from the source asset to the target asset; and
migrating the first subset of the set of data from the source asset to the target asset.

13. The method of claim 1, further comprising:
computing a first expected resource usage for a set of rearrangement management operations;
computing a second expected resource usage for a migration operation;
comparing the first and second expected resource usages; and
performing, based on the second expected resource usage exceeding the first expected resource usage, the set of rearrangement management operations.

14. The method of claim 1, wherein the locking, the identifying, the establishing, and the unlocking each occur in an automated fashion without user intervention.

15. The method of claim 1, further comprising:
metering use of the rearrangement management; and
generating an invoice based on the metered use.

16. A system of rearrangement management for a shared pool of configurable computing resources including a source asset, a target asset, and a memory device having a set of data, the system comprising:
  a memory having a set of computer readable computer instructions, and
  a processor for executing the set of computer readable instructions, the set of computer readable instructions including:
    locking, with respect to modification, a first subset of the set of data on the memory device;
    identifying, in a hypervisor mapping table in a first set of source entries for the source asset, a first set of logical address identifiers for the first subset of the set of data on the memory device;
    establishing, in the hypervisor mapping table in a first set of target entries for the target asset, the first set of logical address identifiers for the first subset of the set of data on the memory device;
    analyzing, in the hypervisor mapping-table, a global set of entries for the source asset having both the first set of source entries for the source asset and a remainder set of entries for the source asset;

detecting, for a second subset of the set of data on the memory device corresponding to the remainder set of entries for the source asset, an ongoing-utilization status;

in response to establishing the first set of logical address identifiers for the first subset of the set of data on the memory device, initiating performance of a migration operation for the second subset of the set of data on the memory device corresponding to the remainder set of entries for the source asset; and unlocking, with respect to modification, the first subset of the set of data on the memory device.

17. A computer program product of rearrangement management for a shared pool of configurable computing resources including a source asset, a target asset, and a memory device having a set of data, the computer program product comprising a computer readable storage medium having program instructions embodied therewith, wherein the computer readable storage medium is not a transitory signal per se, the program instructions executable by a processor to cause the processor to perform a method comprising:

locking, with respect to modification, a first subset of the set of data on the memory device;

identifying, in a hypervisor mapping table in a first set of source entries for the source asset, a first set of logical address identifiers for the first subset of the set of data on the memory device;

establishing, in the hypervisor mapping table in a first set of target entries for the target asset, the first set of logical address identifiers for the first subset of the set of data on the memory device;

analyzing, in the hypervisor mapping-table, a global set of entries for the source asset having both the first set of source entries for the source asset and a remainder set of entries for the source asset;

detecting, for a second subset of the set of data on the memory device corresponding to the remainder set of entries for the source asset, an ongoing-utilization status;

in response to establishing the first set of logical address identifiers for the first subset of the set of data on the memory device, initiating performance of a migration operation for the second subset of the set of data on the memory device corresponding to the remainder set of entries for the source asset; and unlocking, with respect to modification, the first subset of the set of data on the memory device.

18. The computer program product of claim 17, wherein the program instructions are stored in the computer readable storage medium in a data processing system, and wherein the program instructions were downloaded over a network from a remote data processing system.

19. The computer program product of claim 17, wherein the program instructions are stored in the computer readable storage medium in a server data processing system, and wherein the program instructions are downloaded over a network to the remote data processing system for use in a second computer readable storage medium with the remote data processing system.

* * * * *